United States Patent

[11] 3,612,447

[72] Inventor Gail S. Newsom
 Studio City, Calif.
[21] Appl. No. 788,393
[22] Filed Jan. 2, 1969
[45] Patented Oct. 12, 1971
[73] Assignee Lockheed Aircraft Corporation
 Burbank, Calif.

[54] EXTERNAL SURFACE STRUCTURE FOR HYPERSONIC VEHICLES
 15 Claims, 2 Drawing Figs.
[52] U.S. Cl. ................................................. 244/117
[51] Int. Cl. ................................................. B64c 1/38
[50] Field of Search ......................................... 244/117,
 119; 114/74 A; 220/9 A

[56] References Cited
 UNITED STATES PATENTS

| | | | | |
|---|---|---|---|---|
| 3,064,317 | 11/1962 | Dobson | | 244/117.1 |
| 3,064,612 | 11/1962 | Gardner et al. | | 114/74 A |
| 3,145,000 | 8/1964 | Mackie | | 244/117.1 |
| 3,259,516 | 7/1966 | Dempsey et al. | | 244/117.1 |
| 3,355,135 | 11/1967 | Bengtsson | | 114/74 A |
| 3,420,396 | 1/1969 | Bridges et al. | | 220/9 A |

Primary Examiner—Milton Buchler
Assistant Examiner—Steven W. Weinrieb
Attorneys—Lowell G. Turner and George C. Sullivan ABSTRACT: An external surface structure construction is disclosed which is intended to be utilized in hypersonic vehicles such as aircraft. This structure includes a plurality of panels spaced from the substructure of the vehicle and located adjacent to one another so that the adjacent edges of these panels overlap. Each of the panels is supported on the substructure by a rigid mounting member and by at least one flexible mounting member permitting expansion of each panel about the rigid mounting member employed with it. Preferably a plurality of these flexible mounting members are used with each panel. The panels are preferably as large as can be conveniently handled during assembly and maintenance operation.

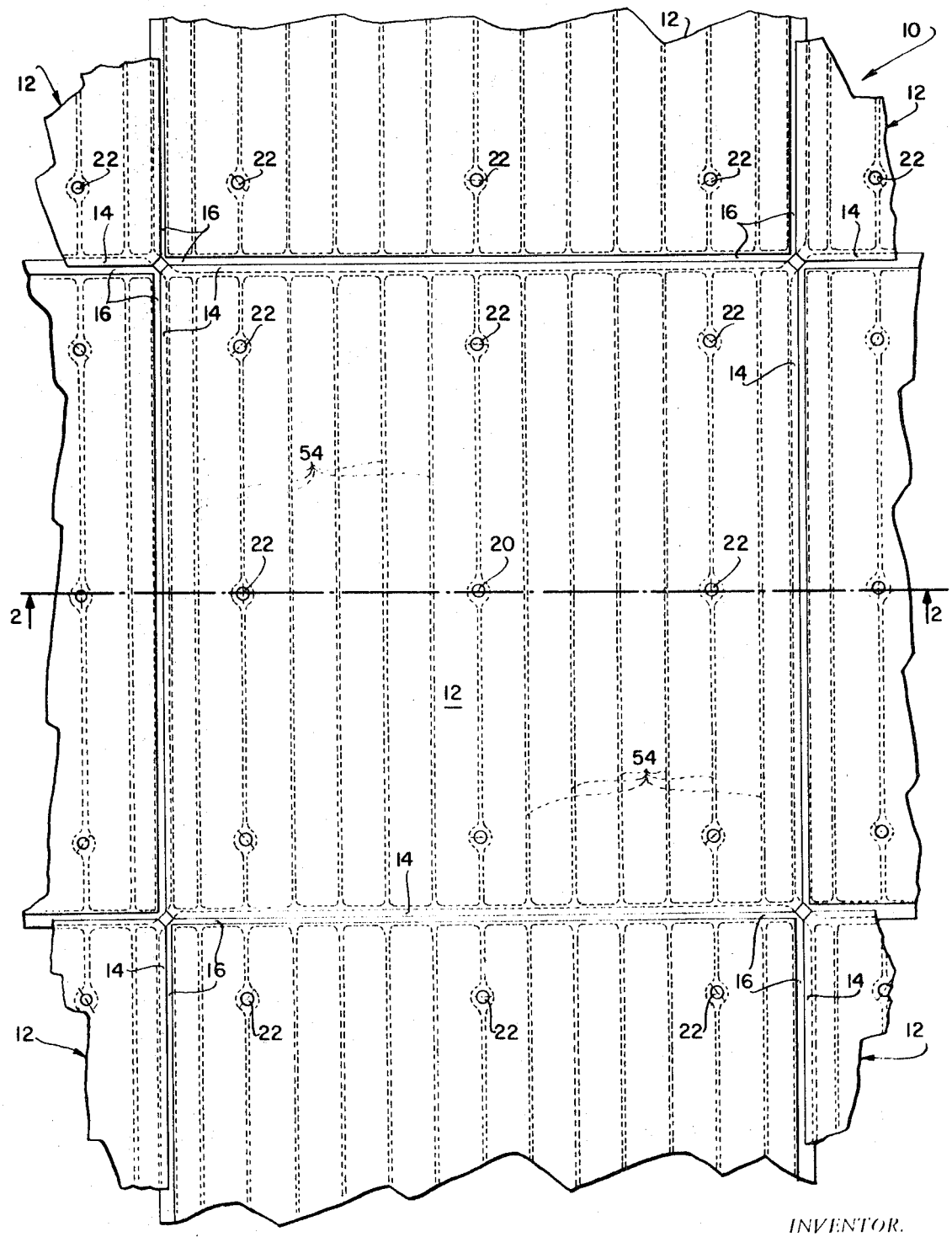
FIG_1

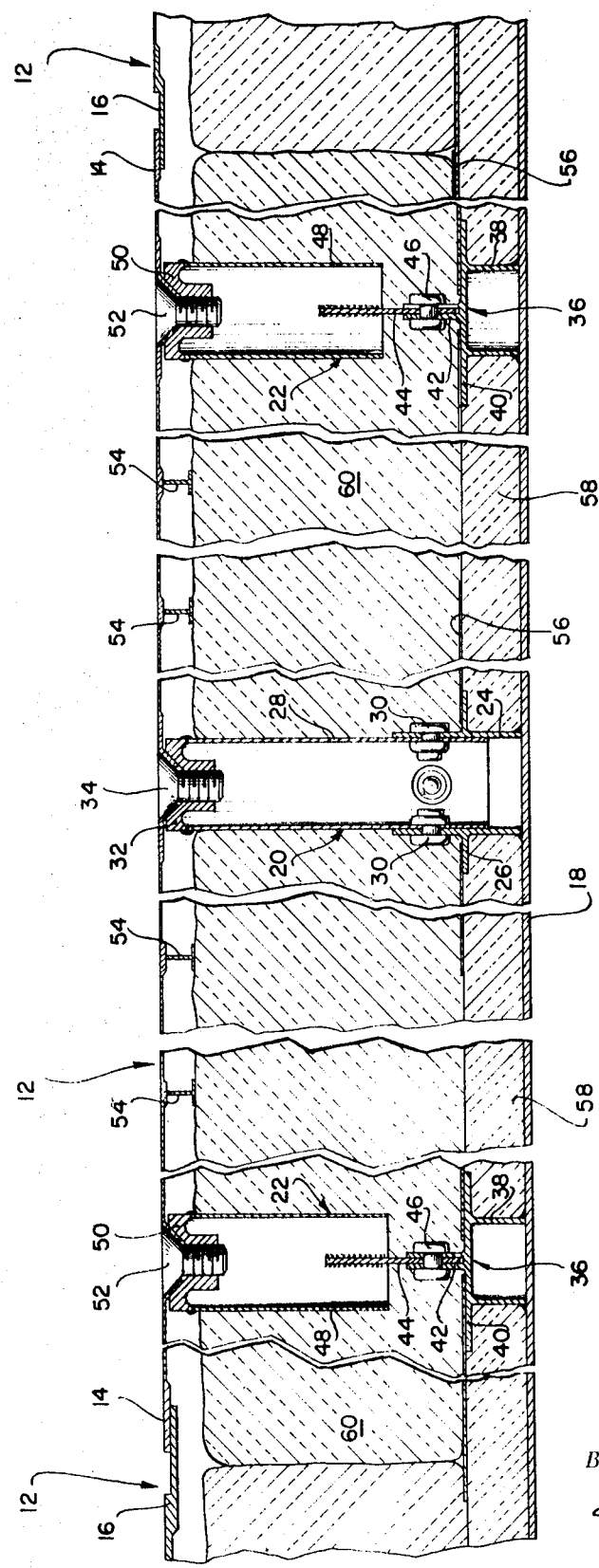
FIG_2

EXTERNAL SURFACE STRUCTURE FOR HYPERSONIC VEHICLES

BACKGROUND OF THE INVENTION

A number of distinct problems have been encountered in developing different vehicles which are capable of moving through the atmosphere at so-called hypersonic speeds. One of the problems which has been encountered is the problem of heat generation at the external surface of such a vehicle. Thus, for example, when an aircraft or other space vehicle is operated at hypersonic speeds of at least Mach 8 as it passes through the atmosphere, a great deal of heat is generated and accumulated at the exposed surface of such a vehicle.

Such heat can cause a number of separate, distinct problems. If the vehicle is not properly constructed it can lead to structural failure within the vehicle or of the vehicle. Obviously this is to be avoided. Such heat can also cause changes in the physical shape of the exterior of the vehicle without actually causing destruction of the vehicle structure. Whenever such changes in shape are encountered the performance characteristics of the vehicle are, of course, altered. Such alteration is also of course undesirable.

Further, such heat can cause interior damage within the vehicle in a number of different ways such as, for example, by vaporizing a liquified gas to a temperature where such a gas cannot be constrained. If a liquified gas should be heated past this temperature, it will of course escape, normally with attendant resulting structural damage. Such a heat buildup may also affect instruments and/or persons within a hypersonic aircraft to a detrimental extent.

As a result of these and various related factors a number of different external surface structure constructions have been proposed for use in the construction of hypersonic vehicles such as various types of aircraft and/or space capsules or the like. In spite of the work performed in this field, it is considered that a completely satisfactory type of external structure construction for use in such vehicles has not been developed. An understanding of this invention does not require a delineation in this specification of the various limitations of the various prior external surface structures constructions for use in hypersonic vehicles. The fact that prior structures constructions have not been considered completely satisfactory is evidenced by continuing research and development work directed towards providing new and improved surface structure constructions for this type of utilization.

SUMMARY OF THE INVENTION

An objective of this invention is to provide new and improved surface structure constructions for hypersonic vehicles which overcome various disadvantages and limitations of prior-related subject matter. A still further objective of this invention of a closely related nature is to provide surface constructions which are capable of giving satisfactory performance in this type of vehicle. Other objectives of this invention are to provide surface structure constructions of the type indicated which may be easily and conveniently manufactured and assembled, which are sufficiently rigid for use in hypersonic vehicles, which enable satisfactory heat control to be achieved with this type of vehicle, and which may be easily and conveniently serviced as the occasion may arise.

In accordance with this invention these objectives are achieved by providing a surface structure constructions which includes a plurality of panels spaced from the substructure of a vehicle and located adjacent to one another with the adjacent edges of the panels overlapping so as to define a continuous surface. In a surface construction of this invention each of these panels is mounted on the vehicle substructure by means of a rigid mounting member and at least one flexible mounting member. Preferably a plurality of flexible mounting members are utilized around the rigid mounting member employed with each panel. With this construction each of the panels is supported so that it can expand and contract with respect to the other adjacent panels about the rigid mounting member to which it is attached.

BRIEF DESCRIPTION OF THE DRAWINGS

Further details of this invention, as well as various other objectives and advantages of it, will be apparent from a careful consideration of the accompanying drawing in which:

FIG. 1 is a partial plan view showing the exterior of a surface structure construction in accordance with this invention; and FIG. 2 is a partial cross-sectional view taken at line 2—2 of FIG 1.

The accompanying drawing is primarily intended to illustrate for explanatory purposes a presently preferred embodiment or form of this invention. Because of this the drawing does not show a precise surface structure construction of this invention drawn to scale. Those skilled in the art to which the invention pertains will realize that the precise construction illustrated may be modified in various different ways through the use or exercise of routine engineering skill without departing from the scope of this invention as defined in the appended claims.

DETAILED DESCRIPTION OF THE PREFERRED EMBODIMENT

In the drawing there is shown an external surface structure construction 10 in accordance with this invention utilized as a part of the exterior of a hypersonic vehicle such as an aircraft, a so-called space capsule and the like. Although only a part of the exterior of such a vehicle is illustrated, it is to be understood that all or any desired part of the exterior of any such vehicle may utilize the external surface structure construction 10 illustrated and hereinafter described.

This structure construction 10 includes a plurality of panels 12 located so as to have adjacent edges 14 and 16 overlapping one another as shown in FIG. 2 of the drawing. The edges 14 illustrated are essentially continuations of the principal portions of these panels 12 while the edges 16 illustrated are small notched extremities on the panels 12 which are adapted to receive edges 14 so as to form an overlapping type of expansion joint. It is considered immaterial whether or not a particular edge of a particular panel 12 is like the edge 14 or like an edge 16 so long as the adjacent edges of two adjacent panels are formed to constitute a joint such as is shown through the use of an edge 14 and an edge 16. With this type of construction the exteriors of the panels 12 cooperate so as to define a continuous, relatively smooth exterior surface.

Each of the panels 12 is joined to a substructure 18 of a hypersonic vehicle by means of a single, rigid mounting member 20 and at least one and preferably a plurality of flexible mounting members 22. These mounting members 20 and 22 may be utilized in connection with any type of a substructure 18 conveniently available. With the construction shown the substructure 18 is intended to represent the wall of a liquid hydrogen tank. It will be realized that an important function of the complete surface structure construction 10 is to insulate a substructure 18 of this type from the heat generated at the external surface of a vehicle with which the invention is utilized.

In accordance with the preferred embodiment of this invention each of the rigid mounting members 20 employed includes a hollow, tubular holder 24 (FIG. 2) secured directly to the substructure 18 by welding or equivalent means. Each of these holders 24 carries an external flange 26 for a purpose as hereinafter described. Each of these holders 24 is also secured to a thin-walled tube 28. The tubes 28 may be attached to the holders 24 rigidly through the use of conventional blind fasteners 30, although other equivalent structures may be used. A bushing 32 is carried at the end of each of the tubes 28 remote from the substructure 18. The bushings 32 may be welded or otherwise secured in position. Each of the bushings 32 is internally threaded so as to receive a conventional threaded fastener 34 which is used for the purpose of securing a panel 12 in place on the rigid mounting member 20.

Each of the flexible mounting members 22 shown includes a different type of holder 36 having a cylindrical base 38 attached directly to the substructure 18 by welding or equivalent means. Each of the holders 36 carries an extending flange 40 corresponding to the flange 26. Each of the holders 36 also includes a bifurcated extension 42 extending away from the substructure 18. The extensions 42 in the holders 36 carry flat platelike spring members 44 and are secured to these members 44 by conventional rivets or similar fasteners 46. These spring members 44 are permanently secured as by welding to tubes or hollow members 48 corresponding to the tube 28 previously described. Each of the tubes 48 carries adjacent to its end remote from the substructure 18 a bushing 50 corresponding to the bushings 32. These bushings 50 are intended to be utilized with fasteners 52 corresponding to the fasteners 34 in securing adjacent portions of each panel 12 to the flexible mounting members 22.

If the surface structure construction 10 is to be employed in a curved area of an aircraft or similar vehicle it may be possible because of structural reasons to locate each panel 12 so that the rigid mounting member 20 used with it is at its center. Similarly, when the surface structure construction 10 is utilized in a curved or similarly shaped area the flexible mounting members 22 may for structural reasons have to be located around a rigid mounting member 20 in other than a uniform manner as indicated by the drawing. In all cases, however, the flexible mounting members 22 employed must be mounted so as to permit expansion and contraction of the panel with which they are used in the direction of the intended orientation of such a panel. These mounting members 22 must also be incompressible so as to preserve in the same relationship the spacing between a panel 12 and the substructure 18. Both the rigid and flexible mounting members 20 and 22, used with panel 12 must be employed so that such a panel supported by these means is adequately held against undesired or unnecessary vibration.

To a degree the number of mounting members 22 required for a particular panel 12 in a particular application may be decreased by providing reinforcing ribs 54 on such a panel 12. The ribs 54 shown have an I-beam-type shape. Other related structural shapes can be used instead of this particular type. These reinforcing ribs 54 should be employed in such a manner that they will not interfere with the normal contraction and expansion of a panel 12 as such a panel changes in dimension because of temperature change. Such ribs 54 may be located in various specific manners dependent upon the direction of aerodynamic loads in order to provide as much reinforcement as is reasonably possible against bending or buckling.

The locations of the flexible mounting members 22 with respect to the rigid mounting member 20 used with any particular panel 12 is considered quite important in obtaining the desired results in the present invention. From the construction of the flexible mounting members 22 it will be apparent that these mounting members 22 can only "bend" in one direction or plane because of the configuration of the spring members 44.

Since a purpose of these flexible mounting members 22 is to hold a panel 12 in such a manner that such a panel 12 cannot unduly vibrate while at the same time it can expand or contract as its temperature changes it is necessary to particularly orient the flexible mounting members 22 employed to permit such expansion and contraction.

This is accomplished by orienting them so that each spring member 44 extends in a plane perpendicular to a line drawn perpendicular to the axis of the rigid mounting member 20 on the panel 12 with which it is used as shown in FIG. 1.

Preferably the flexible mounting members 22 used with any such a panel 12 are disposed roughly equidistant from one another completely around the rigid mounting member 20 used with this panel 12. This tends to reduce the amount of travel at an edge of such a panel 12 during expansion and contraction of the panel 12 itself. In order to achieve a minimum of travel at the edge of a particular panel as a result of temperature changes the rigid mounting 20 used with such a panel is also preferably located as close to the center of the panel 12 as is reasonably possible. For reinforcement purposes the flexible mounting members 22 are preferably located as closely adjacent to the edges of the panels 12 as reasonably possible.

The sizes and shapes of the individual panels 12 and the sizes of the mounting members 20 and 22 used with them can be varied over comparatively wide limits as may be required for particular applications. In general these panels 12 and these mounting members 20 and 22 should be sufficiently strong and of such dimensions that there is no chance of them buckling or breaking during use of a surface structure construction 10. However, the panels used should preferably be as large as is reasonably possible to facilitate installation and assembly. It is presently considered that the individual panels 12 should normally be about 40 inches square, since this is the maximum size that can be conveniently handled by an individual.

Because of the utilization of the surface structure construction 10 all of the parts utilized in connection with it should preferably be formed out of a material which possesses satisfactory physical strength for an intended application at a temperature which can be reasonably expected to be achieved in connection with this application. A number of high-temperature-resistant materials are known at the present time, and it is considered that other such materials will be developed during the course of continuing research.

At present satisfactory results can be achieved by forming the various parts of the complete surface structure construction 10 out of known columbium alloys which possess structural strength at temperatures up to about 2,500° F., so-called "superalloys" containing a significant amount of nickel or cobalt which possess good structural strengths at temperatures of from about 1,500° to about 1,800° F. Other known materials can also of course be utilized.

The various parts of the surface structure construction 10 heretofore described can be used alone to provide an adequate surface structure in certain applications. However, it is normally preferred to incorporate within the surface structure construction 10 insulation which will tend to prevent heat transfer to the substructure 18 employed. This is particularly true when this substructure is a wall of a tank or similar vessel for a liquified gas. When no insulation is utilized the flanges 26 and 40 previously described may be omitted.

However, when these flanges 26 and 40 are utilized they can serve as convenient mountings for a vapor barrier 56 separating bodies 58 and 60 of different types of insulation. In the embodiment of the invention illustrated the bodies 58 of insulation next to the substructure 18 are of a so-called "cryogenic" type preferably utilized against an extremely cold surface while the bodies 60 of insulation closest adjacent to the panel 12 are of a high-temperature type capable of resisting high temperatures without deterioration. Such bodies 58 and 60 and the barrier 56 may be held in place by the panels 12 employed or in other known, conventional manners.

As a result of the use of a multilayer structure consisting of the vapor barrier 56 and the two different bodies of insulation 58 and 60, it is possible to create a structure which is very effective for its intended use. The bodies 60 of insulation utilized where high temperatures are apt to be developed will serve to reduce the heat transmitted to the body 58 of insulation. The vapor barrier 56 will tend to prevent or limit condensation against the cryogenic insulation 58 so as to minimize the possibility of ice build up.

A number of different known materials can be utilized as the vapor barrier 56 and the bodies 58 and 60 of insulation. The cryogenic insulation may be a conventional closed-cell polyurethane composition. The vapor barrier 56 may be conveniently formed of a film of terephthalic acid-ethylene glycol polymer.

Such a film is preferably metallized in conventional manner so as to be capable of reflecting heat. The insulation 60 may be formed of an inorganic material such as random fibers of a glass composition, quartz or the like.

From a careful consideration of the foregoing description it will be apparent that the surface structure 10 is a very effective, relatively inexpensive, easily used and fabricated construction. Those skilled in the field of the design of the exteriors of hypersonic vehicles will realize that the features of this invention may be employed in various different manners for various specific applications. For this reason the invention is to be considered as being limited solely by the appended claims forming a part of this disclosure.

I claim:

1. A surface structure construction located on an aircraft substructure,
   said construction including
   a plurality of panels spaced from said substructure,
   said panels being located adjacent to one another so as to define a continuous surface,
   the adjacent edges of said panels overlapping one another so as to provide expansion and contraction of said panels,
   the improvement comprising
   a single rigid mounting member for rigidly connecting each of said panels to said substructure,
   at least one flexible mounting member for connecting each of said panels to said substructure,
   the rigid and flexible mounting members connecting each panel to said substructure being spaced from each other.

2. A surface structure construction as claimed in claim 1 wherein
   said flexible mounting member is incompressible for preserving the spacing between said panels and said substructure in a substantially constant relationship.

3. A surface structure construction as claimed in claim 1 wherein:
   each said flexible mounting member includes a spring element oriented to bend away from the rigid mounting member on the panel to which it is attached during expansion of said panel.

4. A surface structure construction as claimed in claim 1 wherein:
   each said flexible mounting member includes a flat, platelike spring oriented with respect to said rigid mounting member on the panel to which it is attached so as to provide expansion and contraction of said each of said panels by bending towards and away from said rigid mounting member.

5. A surface structure construction as claimed in claim 1 wherein:
   said rigid mounting member is centrally located with respect to the panel to which it is connected,
   a plurality of said flexible mounting members being connected to each of said panels,
   each of said flexible mounting members connected to each of said panels being located adjacent to an edge of said each of said panels.

6. A surface structure construction as claimed in claim 5 wherein:
   each said flexible mounting member is incompressible for preserving the space between said each of said panels and substructure and being oriented so as to bend away from said rigid mounting member during the expansion of said each of said panels.

7. A surface structure construction as claimed in claim 5 wherein:
   each said flexible mounting member includes a flat, platelike spring and being oriented with respect to the rigid mounting member of said each of said panels so as to provide expansion and contraction of said each of said panels by bending towards and away from said rigid mounting member.

8. A surface structure construction as claimed in claim 1 wherein:
   said rigid mounting member comprises
   a hollow tube securing each of said panels to said substructure, and
   each said flexible mounting member includes
   a hollow member secured to each of said panels,
   a flat, platelike spring member secured to said hollow member, and
   means for connecting said spring member to said substructure, said spring member being oriented with respect to said hollow tube so as to extend perpendicular to a line drawn between it and the axis of said hollow tube.

9. A surface structure construction as claimed in claim 8 wherein:
   said rigid mounting member is centrally located with respect to the panel on which it is mounted,
   a plurality of each said flexible mounting member is mounted to said each of said panels,
   each said flexible mounting member being located next adjacent to an edge of its panel.

10. A surface structure construction as claimed in claim 1 including:
    a cryogenic insulation material disposed against said substructure,
    a vapor barrier film disposed on said cryogenic insulation material, and
    a high-temperature insulation material disposed on said vapor barrier film between it and said each of said panels.

11. A surface structure construction comprising in combination,
    a substructure,
    a panel spaced from said substructure,
    a single rigid mounting member for rigidly connecting said panel to said substructure,
    at least one flexible mounting member connecting said panel to said substructure, said flexible member comprising a holder secured to said substructure,
    a hollow member one end thereof secured to said panel and having its other end extending towards but remote from said holder,
    a flat spring member fastened to said holder and secured interiorly to said hollow member for holding said panel against undue vibration,
    said flat spring member being oriented with respect to said rigid mounting member so as to bend in one plane only as said panel expands and contracts,
    said flat spring member extending perpendicularly to a line drawn perpendicular to the axis of said rigid mounting member.

12. The construction of claim 11 including
    a first body of insulation next adjacent to said panel for resisting high temperatures without deterioration,
    a second body of insulation of a cryogenic nature next adjacent to said substructure,
    a vapor barrier film separating said second body from said first body and tending to prevent or limit condensation against said second body.

13. The construction of claim 12 including
    reinforcing ribs disposed between said panel and first body for reinforcing said panel against bending or buckling.

14. The construction of claim 12 in which
    said second body is a closed-cell polyurethane composition, and
    said vapor barrier film is a terephthalic acid-ethylene glycol polymer.

15. The construction of claim 13 in which
    said second body is a closed-cell polyurethane composition, and
    said vapor barrier film is a terephthalic acid-ethylene glycol polymer.